United States Patent
Zeng et al.

(10) Patent No.: US 11,928,782 B2
(45) Date of Patent: Mar. 12, 2024

(54) METHOD FOR POSITIONING VERTEBRA IN CT IMAGE, APPARATUS, DEVICE, AND COMPUTER READABLE STORAGE MEDIUM

(71) Applicant: PING AN TECHNOLOGY (SHENZHEN) CO., LTD., Guangdong (CN)

(72) Inventors: Chan Zeng, Guangdong (CN); Ge Li, Guangdong (CN); Guanju Cheng, Guangdong (CN); Peng Gao, Guangdong (CN); Guotong Xie, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 125 days.

(21) Appl. No.: 17/613,487

(22) PCT Filed: Oct. 30, 2020

(86) PCT No.: PCT/CN2020/125002
§ 371 (c)(1),
(2) Date: May 7, 2022

(87) PCT Pub. No.: WO2021/189843
PCT Pub. Date: Sep. 30, 2021

(65) Prior Publication Data
US 2023/0186566 A1    Jun. 15, 2023

(30) Foreign Application Priority Data
Sep. 22, 2020    (CN) .......................... 202010998423.2

(51) Int. Cl.
*G06T 19/00*        (2011.01)
*G06T 7/00*         (2017.01)
*G06T 7/73*         (2017.01)

(52) U.S. Cl.
CPC ................ *G06T 19/00* (2013.01); *G06T 5/70* (2024.01); *G06T 7/0012* (2013.01); *G06T 7/73* (2017.01);
(Continued)

(58) Field of Classification Search
None
See application file for complete search history.

(56) References Cited

U.S. PATENT DOCUMENTS

2020/0402231 A1* 12/2020 Jhiang .................... G06T 7/155
2021/0192758 A1*  6/2021 Song ...................... G06T 7/32
2021/0327563 A1* 10/2021 He ........................ G06V 10/462

OTHER PUBLICATIONS

Payer, Christian et al. "Coarse to Fine Vertebrae Localization and Segmentation with Spatial Configuration—Net and U-Net." Visigrapp (2020). (Year: 2020).*

(Continued)

*Primary Examiner* — David H Chu

(57) ABSTRACT

The present disclosure provides a method of positioning vertebra in a CT image, an apparatus, a computer device, and a computer readable storage medium. The method includes: pre-processing vertebra CT image data; inputting the pre-processed vertebra CT image data into a pre-trained neural network to obtain regression results of heat maps of key points corresponding to the pre-processed vertebra CT (Continued)

image data; regressing of 3D heat maps corresponding to the positions of the key points of the vertebra mass center based on the regression results of the heat maps of the key points and the pre-processed vertebra CT image data; serving 3D heat maps corresponding to the positions of the key points of the vertebra mass center as labels, and networked regressing 3D heat map information to position the vertebra. Effects caused by scanning machine difference and scanning noise are avoided, and the vertebra with complex forms is accurately positioned.

16 Claims, 7 Drawing Sheets

(52) U.S. Cl.
CPC ............... *G06T 2200/04* (2013.01); *G06T 2207/10081* (2013.01); *G06T 2207/20084* (2013.01); *G06T 2207/30012* (2013.01); *G06T 2219/004* (2013.01)

(56) References Cited

OTHER PUBLICATIONS

Ronneberger et al., "U-Net: Convolutional Networks for Biomedical Image Segmentation", arXiv:1505.04597v1 [cs.CV] May 18, 2015 (Year: 2015).*
Payer, Christian et al. "Vertebrae Localization and Segmentation with SpatialConfiguration—Net and U-Net", Institute of Computer Graphics and Vision (7100), 2019 (Year: 2019).*
International Search Report of PCT Patent Application No. PCT/CN2020/125002 dated May 26, 2021.
Christian Payer et al., Coarse to Fine Vertebrae Localization and Segmentation with Spatial Configuration—Net and U-Net, Feb. 29, 2020.
Christian Payer et al., Coarse to Fine Vertebrae Localization and Segmentation with SpatialConfiguration—Net and U-Net, In Proceedings of the 15th International Joint Conference on Computer Vision, Imaging and Computer Graphics Theory and Applications, 2020, pp. 124-133, vol. 5.
Christian Payer et al., Vertebrae Localization and Segmentation with SpatialConguration—Net and U-Net, 2019, pp. 1-4.

* cited by examiner

Original image      Enhanced image

METHOD FOR POSITIONING VERTEBRA IN CT IMAGE, APPARATUS, DEVICE, AND COMPUTER READABLE STORAGE MEDIUM

The present application claims priority to Chinese Patent Application No. 202010998423.2 entitled "METHOD FOR POSITIONING VERTEBRA IN CT IMAGE, APPARATUS, DEVICE, AND MEDIUM" filed on Sep. 22, 2020, the contents of which is expressly incorporated by reference herein in its entirety.

TECHNICAL FIELD

The present disclosure relates an image processing field, particular to a method for positioning vertebra in an CT image, an apparatus, a device, and a computer readable storage medium.

BACKGROUND

Spine is a major part in a musculoskeletal system for maintaining and supporting a body and different organ structures. Biomechanics change can cause a cervical vertebra being diseased or bent. If an early detection for preventing or treating the disease is lack, a nervous central can be blocked to cause a chronic disease. A computerized tomography (CT image) with a high resolution ratio in cartilage tissue is a preferred method for studying a spine curve and recognizing a spine malformation.

Due to the complex structure surrounding vertebra, metal implants, and scanning noise, a clinical diagnosis to a technician in radiology department is complex and time-consuming. The vertebra needs to be automatically precise positioned. The method for positioning the vertebra in related art requires a fixed number of the vertebra with a clear shape. Due to some segmental spinal (such as cervical vertebra, lumbar vertebra, and so on), it is unable to position the vertebra in the whole spine.

The method for positioning the vertebra in the related art relies on artificially-designed complex features, such as the form of the vertebra, and it is hart to apply to other abnormal pathological phenomena. Due to the limitation of high correlation of the vertebra, complex rear of vertebra, scanning machine difference, and scanning noise, it is hard to extract effective feature from the CT image by a normal convolutional neural network method, which requires a lot data to be trained. The vertebra cannot be accurately positioned.

SUMMARY OF THE INVENTION

The present disclosure provides a method for positioning vertebra in a CT image. The method includes:

Pre-processing vertebra CT image data;

Inputting the pre-processed vertebra CT image data into a pre-trained neural network to obtain regression results of heat maps of key points corresponding to the pre-processed vertebra CT image data;

Regressing of 3D heat maps corresponding to the positions of the key points of the vertebra mass center based on the regression results of the heat maps of the key points and the pre-processed vertebra CT image data; and Serving 3D heat maps corresponding to the positions of the key points of the vertebra mass center as labels, and networked regressing 3D heat map information to position the vertebra.

The present disclosure also provides an apparatus for positioning vertebra in a CT image. The apparatus includes:

A pre-processing module, configured to pre-process vertebra CT image data;

A training module, configured to input the pre-processed vertebra CT image data into a pre-trained neural network to obtain regression results of heat maps of key points corresponding to the pre-processed vertebra CT image data;

A regressing module, configured to regress of 3D heat maps corresponding to the positions of the key points of the vertebra mass center based on the regression results of the heat maps of the key points and the pre-processed vertebra CT image data; and A positioning module, configured to serve 3D heat maps corresponding to the positions of the key points of the vertebra mass center as labels, and networked regress 3D heat map information to position the vertebra.

The present disclosure also provides a computer device. The computer device includes a storage and a processor. The storage stores computer programs. The processor executes the computer programs to implement the above method for positioning vertebra in a CT image.

The present disclosure also provides a computer readable storage medium. The computer readable storage medium includes computer programs. The computer programs are executed by a processor to implement the above method for positioning vertebra in a CT image.

BRIEF DESCRIPTION OF THE FIGURES

Implementations of the present disclosure will now be described, by way of example only, with reference to the attached figures, wherein.

DETAILED DESCRIPTION

In order to making the technical solutions of the present disclose to be more clearer and more understand, the present disclosure is described in detail with reference to the accompanying drawings and the embodiments. Distinctly, the specific embodiments described herein are a part of embodiments of the present disclosure, but not the entire embodiments of the present disclosure. Other embodiment achieved according to the specific embodiments described herein by those of an ordinary skill in the art are within the protecting range of the present disclosure.

The flowchart in drawings is merely an example, the content and operations or steps are not necessary, nor being implemented as the described sequence. For example, some operations/steps can be decomposed, combined, or partially combined, and the execution sequence can be change due to action conditions.

It should be understood that, terms used in the description of the present disclosure are used for the purpose of describing specific embodiments only and are not intended to limit the present disclosure. Terms "a", "an", and "the" in singular forms as used in the description of the present disclosure and in the appended claims are also intended to cover plural forms, unless specified clearly otherwise in the context.

It should be further understood that, the term "and/or" used in the description of the present disclosure and the appended claims means any combination and all possible combinations of one or more the associated listed items, and comprises these combinations.

The present disclosure provides a method for positioning vertebra in a CT image, an apparatus, a computer device, and a storage medium. The method for positioning vertebra in the CT image can effectively remove the impacts of the scanning machine difference and the scanning noise, thus the vertebra in complex form can also be accurately positioned.

Hereinafter, some embodiment of the present disclose are further described in detail with reference to the accompanying drawings and the embodiments. The embodiments and features in the embodiments can be combined with each other without conflict.

Figure 1:
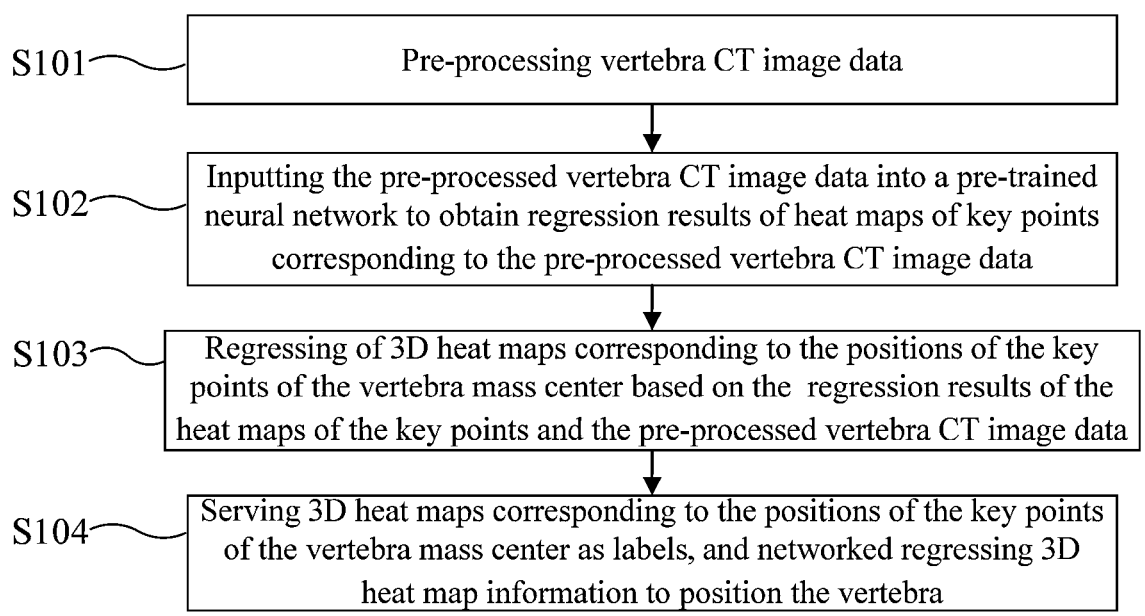
FIG. 1 is a flowchart of an embodiment of a method for positioning vertebra in a CT image.
Figure 2:
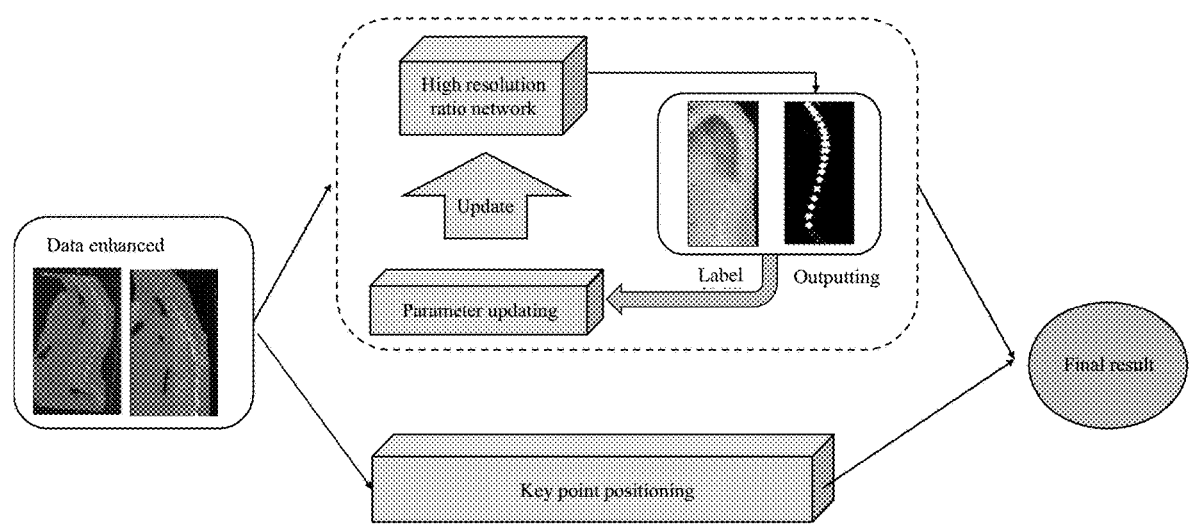
FIG. 2 is a diagram view of an embodiment of a construction of the method for positioning vertebra in a CT image.

Referring to FIGS. 1 and 2, FIG. 1 shows a flowchart of an embodiment of the method for positioning vertebra in a CT image, and FIG. 2 shows a diagram view of an embodiment of a construction of the method for positioning vertebra in the CT image. As shown in FIG. 1, the method for positioning the vertebra in the CT image includes steps S101 to S104.

In block S101, pre-processing vertebra CT image data.

When the vertebra CT image data is obtained, firstly, the vertebra CT image data is pre-processed to make a set of the vertebra CT image data to change according to a unified direction. In detail, a CT image is processed by SimpleITK toolkit, such as the CT image be planned, zoomed, rotated, or elastic deformed, to increase a variety of a training samples.

SimpleITK is a professional software for processing medical images. In SimpleITK, a concept of images is quite different from usual RGB images in a computer vision, which is a multi-dimensional matrix and a mathematical concept. In SimpleITK, the image is a physics entity concept. Each pixel in the images is a point in a physics space with the concept in pixel value, coordinates, distance, and a direction concept.

Figure 3:
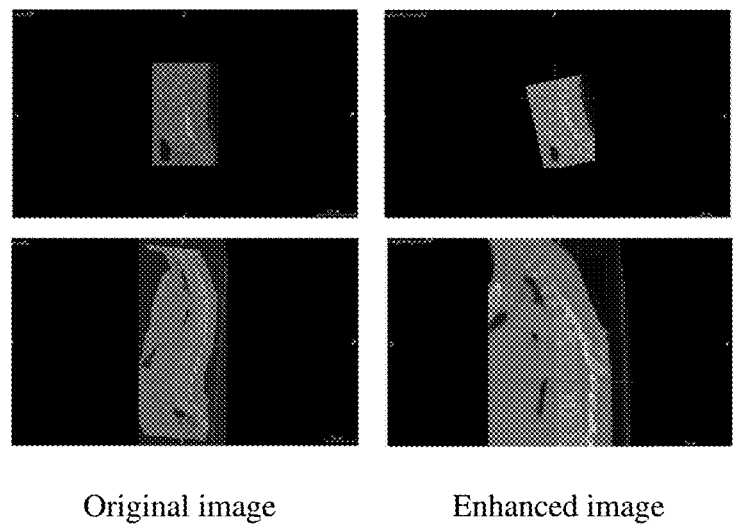
FIG. 3 is diagram views of an embodiment of an original image and a pre-processed image corresponding to the vertebra CT image data.

As shown in FIG. 3, FIG. 3 shows an original image and a pre-processed image corresponding to the vertebra CT image data. Using the SimpleITK, the vertebra CT image data is pre-processed, which is an enhancing operation process, such as being planned, zoomed, rotated, or elastic deformed. When using the pre-processed vertebra CT image data as training samples, parameters in a model is less, and with features in a sufficiency and variety in a training sample.

In block S102, inputting the pre-processed vertebra CT image data into a pre-trained neural network to obtain regression results of heat maps of key points corresponding to the pre-processed vertebra CT image data.

In detail, when obtaining the pre-processed vertebra CT image data, the pre-processed vertebra CT image data is inputted into the pre-trained convolutional neural network for training. The convolutional neural network can be a convolutional neural network with a high resolution ratio.

Thus, the step of inputting the pre-processed vertebra CT image data into the pre-trained neural network to obtain regression results of heat maps of key points corresponding to the pre-processed vertebra CT image data includes:

Inputting the pre-processed vertebra CT image data into the pre-trained neural network with the high resolution ratio. The neural network with the high resolution ratio includes feature images with different resolution ratios being parallel processed.

Interactive processing the pre-processed vertebra CT image data with the feature images with different resolution ratios, and serving 25 3D heat maps as network labels to obtain regression results of the heat maps of 25 key points corresponding to the vertebra.

In some embodiments, questions of positioning the vertebra converts into semantic segmentation questions for regressing 25 3D heat maps. By semantic segmentation, a spine is divided into 25 blocks to obtain the 25 3D heat maps. The whole spine corresponds to 25 blocks, a high pixel value in each of 25 heat maps represents a center of mass of each vertebra for positioning the corresponding vertebra. By regressing 25 3D heat maps, a dependency of the convolutional neural network on data is reduced, and parameters in the model is less.

Figure 4:
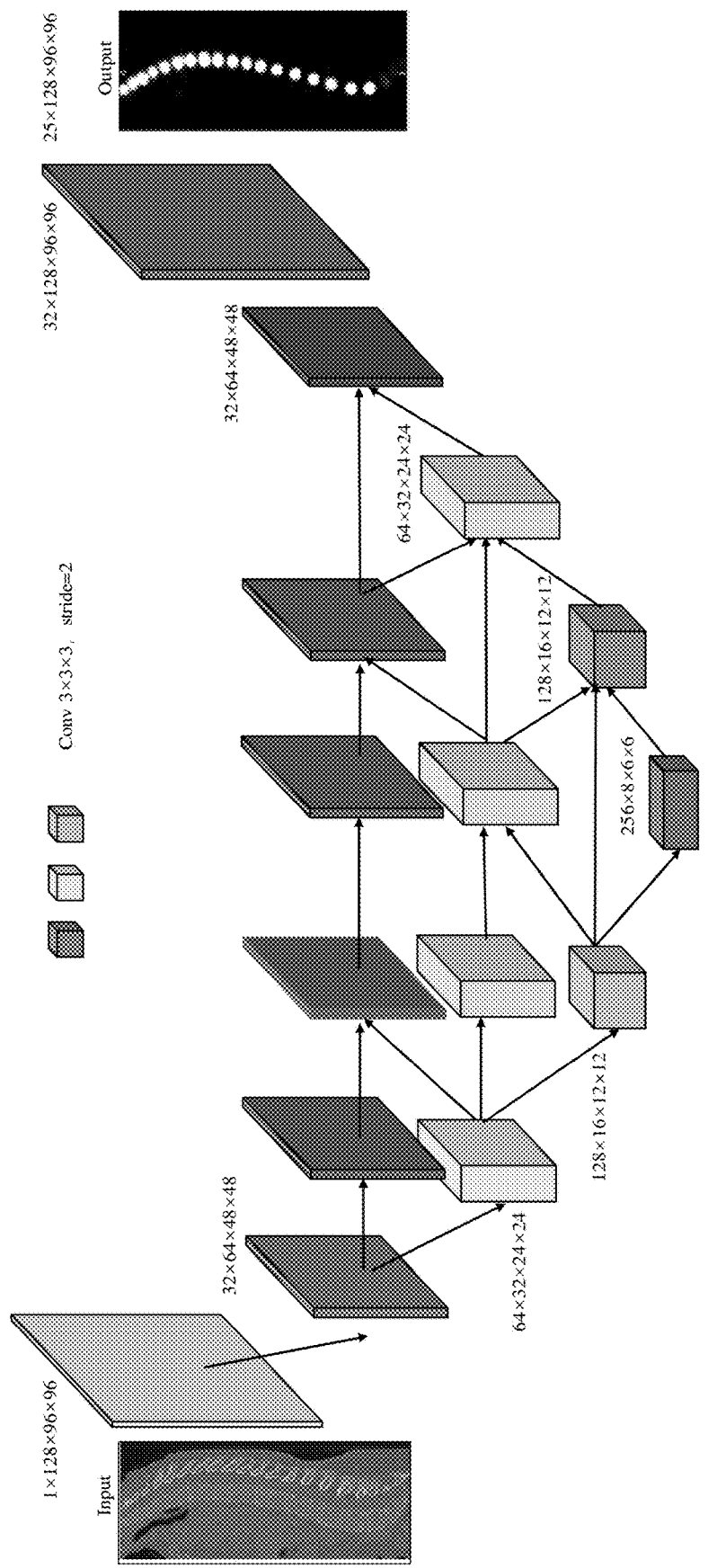
FIG. 4 is a schematic diagram view of an embodiment of a convolutional neural network with high resolution ratio.

It is understood that, the present disclosure uses a convolutional neural network with the high resolution ratio. As shown in FIG. 4, FIG. 4 shows the convolutional neural network with the high resolution ratio of the present disclosure. The pre-processed vertebra CT image data is inputted into the convolutional neural network model to obtain feature images in different resolution ratios.

By comparing to the network construction for decreasing the resolution ratio and then increasing the resolution ratio in series in the related art, the feature images with different resolution ratios is interactive processed with the pre-processed vertebra CT image data, and the 25 3D heat maps are served as the network labels to obtain regression results of the heat maps of the 25 key points corresponding to the vertebra. In the 25 3D heat maps, the closer the pixel to a feature point, the larger pixel value. Otherwise, the farther the pixel to the feature point, the less pixel value. The feature point is a kind of smaller spot. In detail, a construction formula of the 3D heat map is shown as below.

$$g_i(x, \delta_i) = \frac{\gamma}{(2\pi)^{d/2}\delta_i^d} \exp\left(-\frac{\|x - x'_i\|_2^2}{2\delta_i^2}\right)$$

$\gamma$ represents a hyper-parameter; $\delta_i$ represents a learnability parameter; $g_i$ represents a pixel value corresponding to a channel of a i'th feature point in the heat map; x represents a pixel position; x' represents a key point position; d represents a dimension of the heat map; a loss function is L2.

The convolutional neural network with the high resolution ratio provides a high resolution ratio representation in the whole network construction for improving a performance of the model. By training the pre-processed vertebra CT image data by the convolutional neural network with the high resolution ratio, the obtained neural network model is in a high robustness and generalization, and an over-fitting is avoided. By constructing the convolutional neural network with the high resolution ratio, any segment in the vertebra can be automatically positioned, a feature extractor in a complex and artificially designed based on morphology of vertebra form on can be omitted.

For ensuring a privacy and a security of the network labels, the network labels are stored in a node of a blockchain.

In block S103, regressing of 3D heat maps corresponding to the positions of the key points of the vertebra mass center based on the regression results of the heat maps of the key points and the pre-processed vertebra CT image data.

In some embodiment, the step of executing the regressions of 3D heat maps corresponding to the positions of the key points of the vertebra mass center based on the regression results of the heat maps of the key points and the pre-processed vertebra CT image data can includes:

By combining a U shaped convolutional neural network and space information extraction network, serving the pre-processed vertebra CT image data as an input, serving the position of the key points of the vertebra center mass as the labels, for confirming heat maps corresponding to 6 target positions in the regression result of the 25 heat maps of the key points.

The heat maps corresponding to the 6 target positions include 3D heat maps corresponding to a first block of a cervical vertebra, a last block of the cervical vertebra, a first block of a lumbar vertebra, a last block of the lumbar vertebra, a first block of a thoracic vertebra, and a last block of the thoracic vertebra.

In detail, when obtaining the 25 3D heat maps, the 25 3D heat maps correspond to all blocks of the whole vertebra, and there are different types. If merely using the convolutional neural network with the high resolution ratio, the type of the block of the vertebra can be misjudged. In the whole vertebra, the first and last blocks of the cervical vertebra, the 6 key points of the first and the last block of the lumbar vertebra, and the first and the last of the thoracic vertebra are in high significance, and can be easily identified. Thus, as an idea of a thesis of Christian Payer, the set of the pre-processed vertebra CT images data is served as the input, the position of the key points of the vertebra center mass is served as the labels, and a network construction is combined by the U shaped convolutional neural network and the space information extraction network. A regression result is obtained by regressing the 6 3D heat map information from the regression results of the 25 heat maps of the key points for confirming the 3D heat maps of the 6 target positions.

Figure 5:
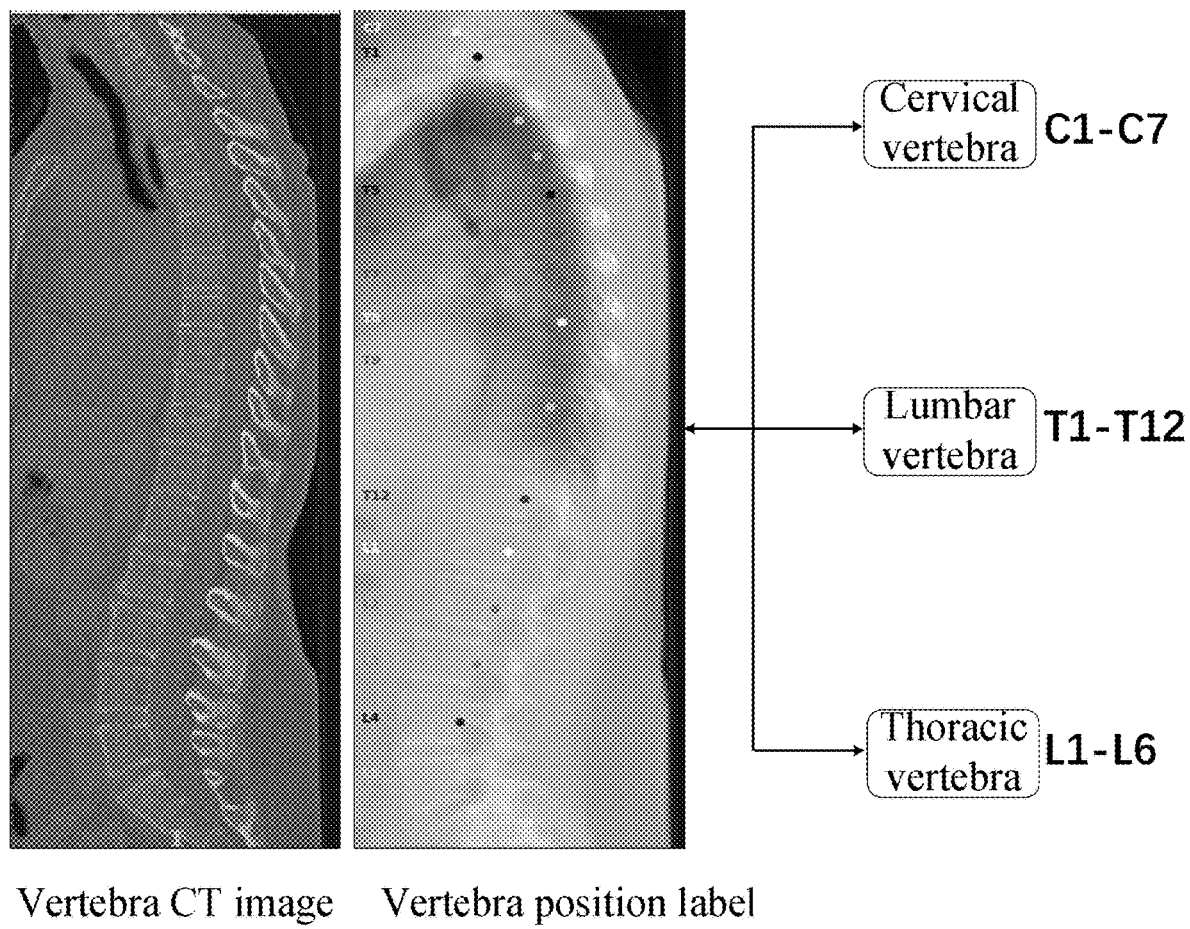
FIG. 5 is a schematic diagram view of an embodiment of an image corresponding to six 3D heat maps.

As shown in FIG. 5, FIG. 5 shows 6 confirmed 3D heat maps of the present disclosure. By comparing with positioning by 25 vertebras, the network construction of 6 3D heat maps can be easily converged, and a positioning accuracy is better.

In block S104, serving 3D heat maps corresponding to the positions of the key points of the vertebra mass center as labels, and networked regressing 3D heat map information to position the vertebra.

In some embodiments, when obtaining the 3D heat maps corresponding to the 6 key points, the step of serving 3D heat maps corresponding to the positions of the key points of the vertebra mass center as labels, and networked regressing 3D heat map information to position the vertebra further includes:

Locating positions of key points corresponding to the 3D heat maps of the 6 target positions;

Limiting a predetermined space range between blocks, serving the 3D heat maps corresponding to the positions of the key points of the vertebra as the labels, networked regressing the 3D heat maps information to position the vertebra.

When obtaining the 3D heat maps corresponding to the 6 target positions, a maximum value of each 3D heat maps corresponding to the 6 target positions is obtained and served as the position of the key point. Based on the predetermined space range between the key points, for example when the first and last block of the cervical vertebra is in the predetermined range, the limitation of the predetermined space range between the blocks is combined with an output result of the convolutional neural network with the high resolution ratio, the output result is served as the labels of the 3D heat maps corresponding to the positions of the key points of the vertebra for accurately positioned the vertebra.

By the combination of the convolutional neural network with the high resolution ratio and the positioning of the key points, a post processing is optimized, and the problem of type misjudgments, caused by the large number of bones, is solved, thus a positioning result can be more accurate.

Based on the method for positioning the vertebra in the CT image, the vertebra CT image data is pre-processed, the pre-processed vertebra CT image data is inputted into the pre-trained neural network model, the neural network model can be a convolutional neural network with the high resolution ratio, the regression result of the heat maps of the key points corresponding to the pre-processed vertebra CT image data, then 3D heat maps corresponding to the positions of the key points of the vertebra mass center are regressed based on the heat map regression results of the key points and the pre-processed vertebra CT image data. The 3D heat maps corresponding to the positions of the key points of the vertebra mass center are served as labels, the labels have an advantage in a high robustness and generalization. The 3D heat map information is networked regressed to position the vertebra. By the combination of the convolutional neural network with the high resolution ratio and the positioning of the key points, the problem of type misjudgments, caused by the large number of bones, is solved, thus a positioning result can be more accurate. The network model in the present disclosure can be easily trained, and the convolutional neural network is in a high robustness and generalization, and is independent of training a data set with clearly outlines. Effects caused by the scanning machine difference and the scanning noise are removed, and the vertebra with complex forms can be accurately positioned.

Figure 6:
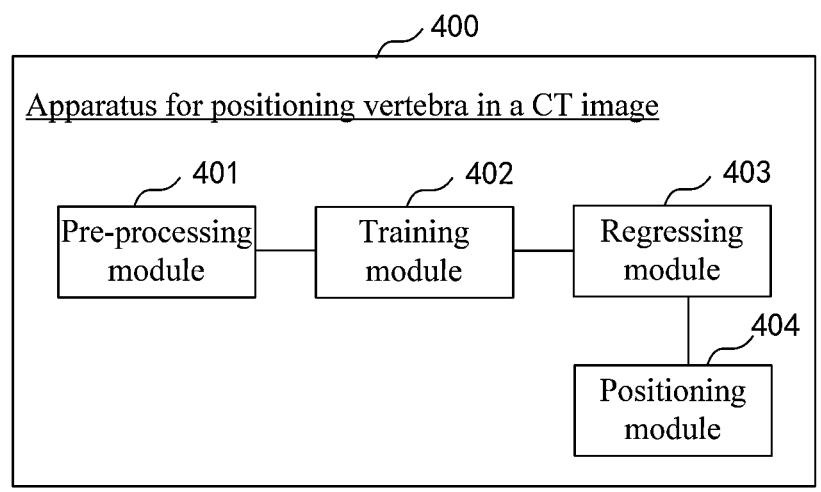
FIG. 6 is a diagram view of an embodiment of an apparatus for positioning vertebra in a CT image.

Referring to FIG. 6, FIG. 6 shows an apparatus for positioning vertebra in a CT image of the present disclosure. The apparatus implements the above method for positioning vertebra in a CT image. The apparatus for positioning vertebra in the CT image is configured in a server or a terminal device.

As shown in FIG. 6, the apparatus 400 for positioning vertebra in the CT image includes a pre-processing module 401, a training module 402, a regressing module 403, and a positioning module 404.

The pre-processing module 401 is configured to pre-process vertebra CT image data.

The training module 402 is configured to input the pre-processed vertebra CT image data into a pre-trained neural network to obtain regression results of heat maps of key points corresponding to the pre-processed vertebra CT image data.

The regressing module 403 is configured to regress of 3D heat maps corresponding to the positions of the key points of the vertebra mass center based on the regression results of the heat maps of the key points and the pre-processed vertebra CT image data.

The positioning module 404 is configured to serve 3D heat maps corresponding to the positions of the key points of the vertebra mass center as labels, and networked regress 3D heat map information to position the vertebra.

It should be understood that, for simplicity and clarification, people having ordinary skill in the art should be able to refer the corresponding operations and the procedures of the method as described above for the operating procedures of the aforementioned apparatus and modules, and thus the description will not be repeated.

The apparatus can be executed in a manner of computer programs. The computer programs can be implemented in a computer device as shown in FIG. 7.

Figure 7:
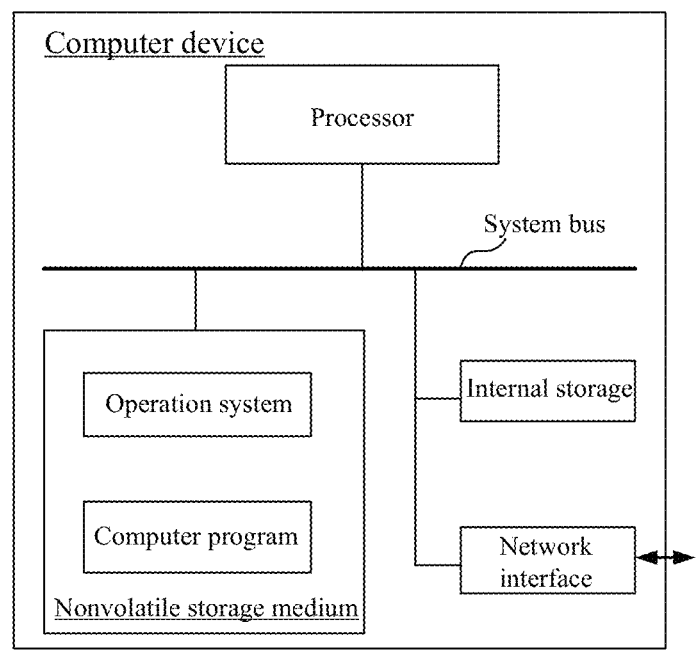
FIG. 7 is a diagram view of an embodiment of a computer device.

Referring to FIG. 7, FIG. 7 is a computer device of the present disclosure. The computer device can be a server.

As shown in FIG. 7, the computer device includes a processor, a storage, and a network interface, which are connected through a system bus. The storage can include a volatile storage or a non-volatile storage.

The non-volatile storage can store an operation system and computer programs. The computer programs include program instructions. When the computer instructions being executed, the processor implements a method for positioning vertebra in the CT image.

The processor is configured to provide computation and control ability, for supporting an operation of the computer device.

The internal storage provides an operation environment of the computer instructions of the non-volatile storage. When the computer instructions being executed, the processor implements the method for confirming the cup-disc ratio based on the neural network.

The network interface is configured to provide a network communication, such as sending an assigned task, and so on. It is understood that, the structure as shown in FIG. 7 is a partial structure related to the present disclosure, and are not intended to limit the computer device applied the present disclosure. The computer device can include more or less components, or some components being combined, or different components.

It is understood that, the processor can be a central processing unit (CPU), and can be other general processor, a digital signal processor (DSP), an application specific integrated circuit (ASIC), a field programmable gate array (FPGA), or other programmable logic device, a separate gate or transistor logic device, a separate hardware component, and so on. The general processor can be a microprocessor, other regular data processing chips, and so on.

In one embodiment, the processor executes the computer programs stored in the storage to implement the following steps:

Pre-processing vertebra CT image data;

Inputting the pre-processed vertebra CT image data into a pre-trained neural network to obtain regression results of heat maps of key points corresponding to the pre-processed vertebra CT image data;

Regressing of 3D heat maps corresponding to the positions of the key points of the vertebra mass center based on the regression results of the heat maps of the key points and the pre-processed vertebra CT image data;

Serving 3D heat maps corresponding to the positions of the key points of the vertebra mass center as labels, and networked regressing 3D heat map information to position the vertebra.

In some embodiments, when the processor executes the computer programs stored in the storage to implement the step of inputting the pre-processed vertebra CT image data into a pre-trained neural network to obtain regression results of heat maps of key points corresponding to the pre-processed vertebra CT image data, the processor further executes the computer programs stored in the storage to implement the following steps:

Inputting the pre-processed vertebra CT image data into the pre-trained neural network with the high resolution ratio; the neural network with the high resolution ratio includes feature images with different resolution ratios being parallel processed.

Interactive processing the pre-processed vertebra CT image data with the feature images with different resolution ratios, and serving 25 3D heat maps as network labels to obtain regression results of the heat maps of 25 key points corresponding to the vertebra.

In some embodiments, when the processor executes the computer programs stored in the storage to implement the step of regressing of 3D heat maps corresponding to the positions of the key points of the vertebra mass center based on the regression results of the heat maps of the key points and the pre-processed vertebra CT image data, the processor further executes the computer programs stored in the storage to implement the following steps:

By combining a U shaped convolutional neural network and space information extraction network, serving the pre-processed vertebra CT image data as an input, serving the position of the key points of the vertebra center mass as the labels, for confirming heat maps corresponding to 6 target positions in the regression result of the 25 heat maps of the key points.

The heat maps corresponding to the 6 target positions include 3D heat maps corresponding to a first block of a cervical vertebra, a last block of the cervical vertebra, a first block of a lumbar vertebra, a last block of the lumbar vertebra, a first block of a thoracic vertebra, and a last block of the thoracic vertebra.

In some embodiments, when the processor executes the computer programs stored in the storage to implement the step of serving 3D heat maps corresponding to the positions of the key points of the vertebra mass center as labels, and networked regressing 3D heat map information to position the vertebra, the processor further executes the computer programs stored in the storage to implement the following steps:

Locating positions of key points corresponding to the 3D heat maps of the 6 target positions;

Limiting a predetermined space range between blocks, serving the 3D heat maps corresponding to the positions of the key points of the vertebra as the labels, networked regressing the 3D heat maps information to position the vertebra.

In some embodiments, when the processor executes the computer programs stored in the storage to implement the step of locating positions of key points corresponding to the 3D heat maps of the 6 target positions, the processor further executes the computer programs stored in the storage to implement the following steps:

Obtaining a maximum value of each 3D heat maps corresponding to the 6 target positions and serving as the position of the key point.

In some embodiments, when the processor executes the computer programs stored in the storage to implement the step of pre-processing vertebra CT image data, the processor further executes the computer programs stored in the storage to implement the following steps:

Enhancing the vertebra CT image data by SimpleITK toolkit to obtain the vertebra CT image data with a variety of a training samples.

The present disclosure also provides a computer readable storage medium. The computer readable storage medium can be a non-volatile or a volatile. The computer readable storage medium stores computer programs. The computer programs include program instructions. The program instructions being executed by a processor to implement a method for positioning vertebra in a CT image of the present disclosure.

The computer readable storage medium can be an internal storage of the foregoing computer device, such as a hard disk or a memory. The computer readable storage medium also can be external storage device of the computer device, such as a plug-in hard disk in the computer device, a smart media card (SMC), a secure digital (SD), a flash card, and so on.

Further, the computer readable storage medium includes a program storing area and a data storing area. The program storing area stores operation systems, and an application program of at least one function, and so on. The data storing area stores data, which is created while using a node of a blockchain.

It is understood that, the blockchain is a novel application mode based on computer technologies, such as distribution data storage, node-to-node transmission, consensus mechanism, and encryption algorithm. The blockchain is essentially a distributed database, and a series of blocks generated in a cryptography method. Each block contains all information about a batch of network transactions for verifying the validity of the information (for anti-counterfeiting) and generating a next block. The blockchain can include an underlying blockchain platform, a platform product service layer, and an application service layer, and so on.

The foregoing implementations are merely preferably embodiments of the present disclosure, and are not intended to limit the protection scope of the present disclosure. Any equivalent structure variation using the present disclosure and drawings, being directly or indirectly used in other related technical fields shall all fall into the protection scope of the present disclosure. Thus, the protection scope of the present disclosure shall be subjected to the protection scope of the claims.

What is claimed is:

1. A method for positioning vertebra in an CT image, the method comprising following steps:
   pre-processing vertebra CT image data;
   inputting the pre-processed vertebra CT image data into a pre-trained neural network to obtain regression results of heat maps of key points corresponding to the pre-processed vertebra CT image data;
   regressing of 3D heat maps corresponding to the positions of the key points of the vertebra mass center based on the regression results of the heat maps of the key points and the pre-processed vertebra CT image data; and
   serving 3D heat maps corresponding to the positions of the key points of the vertebra mass center as labels, and networked regressing 3D heat map information to position the vertebra; wherein the step of inputting the pre-processed vertebra CT image data into a pre-trained neural network to obtain regression results of heat maps of key points corresponding to the pre-processed vertebra CT image data comprising:
   inputting the pre-processed vertebra CT image data into the pre-trained neural network with the high resolution ratio; the neural network with the high resolution ratio includes feature images with different resolution ratios being parallel processed; and
   interactive processing the pre-processed vertebra CT image data with the feature images with different resolution ratios, and serving 25 3D heat maps as network labels to obtain regression results of the heat maps of 25 key points corresponding to the vertebra.

2. The method of claim 1, wherein the step of regressing of 3D heat maps corresponding to the positions of the key points of the vertebra mass center based on the regression results of the heat maps of the key points and the pre-processed vertebra CT image data comprising:
   by combining a U shaped convolutional neural network and space information extraction network, serving the pre-processed vertebra CT image data as an input, serving the position of the key points of the vertebra center mass as the labels, for confirming heat maps corresponding to 6 target positions in the regression result of the 25 heat maps of the key points; the heat maps corresponding to the 6 target positions include 3D heat maps corresponding to a first block of a cervical vertebra, a last block of the cervical vertebra, a first block of a lumbar vertebra, a last block of the lumbar vertebra, a first block of a thoracic vertebra, and a last block of the thoracic vertebra.

3. The method of claim 2, wherein the step of serving 3D heat maps corresponding to the positions of the key points of the vertebra mass center as labels, and networked regressing 3D heat map information to position the vertebra comprising:
   locating positions of key points corresponding to the 3D heat maps of the 6 target positions; and
   limiting a predetermined space range between blocks, serving the 3D heat maps corresponding to the positions of the key points of the vertebra as the labels, networked regressing the 3D heat maps information to position the vertebra.

4. The method of claim 3, wherein the step of locating positions of key points corresponding to the 3D heat maps of the 6 target positions comprising:
   obtaining a maximum value of each 3D heat maps corresponding to the 6 target positions and serving as the position of the key point.

5. The method of claim 1, wherein the step of pre-processing vertebra CT image data comprising:
   enhancing the vertebra CT image data by SimpleITK toolkit to obtain the vertebra CT image data with a variety of a training samples.

6. The method of claim 1, wherein a construction formula of the 3D heat map is $$g_i(x, \delta_i) = \frac{\gamma}{(2\pi)^{d/2} \delta_i^d} \exp\left(-\frac{\|x - x'_i\|_2^2}{2\delta_i^2}\right),$$

$\gamma$ represents a hyper-parameter; $\delta_i$ represents a learnability parameter; $g_i$ represents a pixel value corresponding to a channel of a i'th feature point in the heat map; x represents a pixel position; x' represents a key point position; d represents a dimension of the heat map; a loss function is L2.

7. A computer device, the computer device comprises a storage and a processor;
   the storage stores computer programs; and
   the processor executes the computer programs to implement the following steps:
   pre-processing vertebra CT image data;
   inputting the pre-processed vertebra CT image data into a pre-trained neural network to obtain regression results of heat maps of key points corresponding to the pre-processed vertebra CT image data;

regressing of 3D heat maps corresponding to the positions of the key points of the vertebra mass center based on the regression results of the heat maps of the key points and the pre-processed vertebra CT image data; and serving 3D heat maps corresponding to the positions of the key points of the vertebra mass center as labels, and networked regressing 3D heat map information to position the vertebra, wherein the step of inputting the pre-processed vertebra CT image data into a pre-trained neural network to obtain regression results of heat maps of key points corresponding to the pre-processed vertebra CT image data comprising:

inputting the pre-processed vertebra CT image data into the pre-trained neural network with the high resolution ratio; the neural network with the high resolution ratio includes feature images with different resolution ratios being parallel processed; and interactive processing the pre-processed vertebra CT image data with the feature images with different resolution ratios, and serving 25 3D heat maps as network labels to obtain regression results of the heat maps of 25 key points corresponding to the vertebra.

8. The computer device of claim 7, wherein the step of regressing of 3D heat maps corresponding to the positions of the key points of the vertebra mass center based on the regression results of the heat maps of the key points and the pre-processed vertebra CT image data comprising:

by combining a U shaped convolutional neural network and space information extraction network, serving the pre-processed vertebra CT image data as an input, serving the position of the key points of the vertebra center mass as the labels, for confirming heat maps corresponding to 6 target positions in the regression result of the 25 heat maps of the key points; the heat maps corresponding to the 6 target positions include 3D heat maps corresponding to a first block of a cervical vertebra, a last block of the cervical vertebra, a first block of a lumbar vertebra, a last block of the lumbar vertebra, a first block of a thoracic vertebra, and a last block of the thoracic vertebra.

9. The computer device of claim 8, wherein the step of serving 3D heat maps corresponding to the positions of the key points of the vertebra mass center as labels, and networked regressing 3D heat map information to position the vertebra comprising:

locating positions of key points corresponding to the 3D heat maps of the 6 target positions; and limiting a predetermined space range between blocks, serving the 3D heat maps corresponding to the positions of the key points of the vertebra as the labels, networked regressing the 3D heat maps information to position the vertebra.

10. The computer device of claim 8, wherein the step of locating positions of key points corresponding to the 3D heat maps of the 6 target positions comprising:

obtaining a maximum value of each 3D heat maps corresponding to the 6 target positions and serving as the position of the key point.

11. The computer device of claim 7, wherein the step of pre-processing vertebra CT image data comprising:

enhancing the vertebra CT image data by SimpleITK toolkit to obtain the vertebra CT image data with a variety of a training samples.

12. The computer device of claim 7, wherein a construction formula of the 3D heat map is $$g_i(x, \delta_i) = \frac{\gamma}{(2\pi)^{d/2} \delta_i^d} \exp\left(-\frac{\|x - x'_i\|_2^2}{2\delta_i^2}\right),$$

$\gamma$ represents a hyper-parameter; $\delta_i$ represents a learnability parameter; $g_i$ represents a pixel value corresponding to a channel of a i'th feature point in the heat map; x represents a pixel position; x' represents a key point position; d represents a dimension of the heat map; a loss function is L2.

13. A non-transitory computer readable storage medium, the computer readable storage medium stores computer programs; the computer programs are executed by at least one processor to implement the following steps:

pre-processing vertebra CT image data;

inputting the pre-processed vertebra CT image data into a pre-trained neural network to obtain regression results of heat maps of key points corresponding to the pre-processed vertebra CT image data;

regressing of 3D heat maps corresponding to the positions of the key points of the vertebra mass center based on the regression results of the heat maps of the key points and the pre-processed vertebra CT image data; and serving 3D heat maps corresponding to the positions of the key points of the vertebra mass center as labels, and networked regressing 3D heat map information to position the vertebra, wherein the step of inputting the pre-processed vertebra CT image data into a pre-trained neural network to obtain regression results of heat maps of key points corresponding to the pre-processed vertebra CT image data comprising:

inputting the pre-processed vertebra CT image data into the pre-trained neural network with the high resolution ratio; the neural network with the high resolution ratio includes feature images with different resolution ratios being parallel processed; and interactive processing the pre-processed vertebra CT image data with the feature images with different resolution ratios, and serving 25 3D heat maps as network labels to obtain regression results of the heat maps of 25 key points corresponding to the vertebra.

14. The non-transitory computer readable storage medium of claim 13, wherein the step of regressing of 3D heat maps corresponding to the positions of the key points of the vertebra mass center based on the regression results of the heat maps of the key points and the pre-processed vertebra CT image data comprising:

by combining a U shaped convolutional neural network and space information extraction network, serving the pre-processed vertebra CT image data as an input, serving the position of the key points of the vertebra center mass as the labels, for confirming heat maps corresponding to 6 target positions in the regression result of the 25 heat maps of the key points; the heat maps corresponding to the 6 target positions include 3D heat maps corresponding to a first block of a cervical vertebra, a last block of the cervical vertebra, a first block of a lumbar vertebra, a last block of the lumbar vertebra, a first block of a thoracic vertebra, and a last block of the thoracic vertebra.

15. The non-transitory computer readable storage medium of claim 14, wherein the step of serving 3D heat maps corresponding to the positions of the key points of the vertebra mass center as labels, and networked regressing 3D heat map information to position the vertebra comprising:
   locating positions of key points corresponding to the 3D heat maps of the 6 target positions; and
   limiting a predetermined space range between blocks, serving the 3D heat maps corresponding to the positions of the key points of the vertebra as the labels, networked regressing the 3D heat maps information to position the vertebra.

16. The non-transitory computer readable storage medium of claim 14, wherein the step of locating positions of key points corresponding to the 3D heat maps of the 6 target positions comprising:
   obtaining a maximum value of each 3D heat maps corresponding to the 6 target positions and serving as the position of the key point.

* * * * *